(12) United States Patent
Callaway et al.

(10) Patent No.: US 6,633,906 B1
(45) Date of Patent: Oct. 14, 2003

(54) METHOD AND SYSTEM FOR MANAGING WINDOWS DESKTOPS IN A HETEROGENEOUS SERVER ENVIRONMENT

(75) Inventors: Janet Roberts Callaway, Austin, TX (US); David Paul Dutcher, Austin, TX (US); Denise Ann Morganti, Austin, TX (US); David Michael Reichek, Austin, TX (US); Stanley Alan Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/299,937

(22) Filed: Apr. 26, 1999

(51) Int. Cl.[7] .............................................. G06F 15/173
(52) U.S. Cl. ...................................... 709/223; 709/224
(58) Field of Search ................................ 709/223, 224, 709/225, 226, 244

(56) References Cited

U.S. PATENT DOCUMENTS

| | | | | |
|---|---|---|---|---|
| 5,655,081 A | * | 8/1997 | Bonnell et al. | 709/202 |
| 5,694,595 A | * | 12/1997 | Jacobs et al. | 707/9 |
| 5,748,896 A | * | 5/1998 | Daly et al. | 709/223 |
| 5,859,978 A | * | 1/1999 | Sonderegger et al. | |
| 6,029,196 A | * | 2/2000 | Lenz | 709/221 |
| 6,044,465 A | * | 3/2000 | Dutcher et al. | 713/200 |
| 6,047,312 A | * | 4/2000 | Brooks et al. | 709/203 |
| 6,065,054 A | * | 5/2000 | Dutcher et al. | 709/226 |
| 6,070,190 A | * | 5/2000 | Reps et al. | 709/224 |
| 6,070,191 A | * | 5/2000 | Narendran et al. | 709/226 |
| 6,216,162 B1 | * | 4/2001 | Dutcher et al. | 709/226 |
| 6,269,405 B1 | * | 7/2001 | Dutcher et al. | 709/248 |
| 6,347,331 B1 | * | 2/2002 | Dutcher et al. | 709/203 |

OTHER PUBLICATIONS

Citrix Metaframe; Citrix/Microsoft May 12, 1997 Agreement pp. 1–30.*

* cited by examiner

Primary Examiner—Krisna Lim
(74) Attorney, Agent, or Firm—Duke W. Yee; Jeffrey S. LaBaw; Betty Formby (57) ABSTRACT

A method and system for managing Windows desktops in a heterogeneous server environment is provided. A Windows User Profile is generated for a user and associatively stored with desktop information in a datastore on a heterogeneous server. The heterogeneous server may be a non-Windows-based server. The desktop information provides configurability of a desktop of a Windows-based data processing system. The desktop may be a restricted desktop that may be either non-modifiable or only temporarily modifiable by the user for a session on the Windows-based data processing system. The datastore may contain a pair of desktops for a user, in which one of the pair of desktops is a Windows NT desktop and one of the pair of desktops is a Windows 95 desktop or a Windows 98 desktop.

41 Claims, 6 Drawing Sheets

METHOD AND SYSTEM FOR MANAGING WINDOWS DESKTOPS IN A HETEROGENEOUS SERVER ENVIRONMENT

CROSS REFERENCE TO RELATED APPLICATIONS

The present invention is related to applications entitled METHOD AND APPARATUS TO UPDATE A WINDOWS REGISTRY FROM A HETEROGENEOUS SERVER, Ser. No. 09/299,939, filed Apr. 26, 1999, now U.S. Pat. No. 6,347,331; METHOD AND APPARATUS FOR DYNAMIC DISTRIBUTION OF SYSTEM FILE AND SYSTEM REGISTRY CHANGES IN A DISTRIBUTED DATA PROCESSING SYSTEM, Ser. No. 09/299,936, filed: Apr. 26, 1999; METHOD AND SYSTEM FOR USER-SPECIFIC MANAGEMENT OF APPLICATIONS IN A HETEROGENEOUS SERVER ENVIRONMENT, Ser. No. 09/299,951, filed: Apr. 26, 1999; METHOD AND SYSTEM FOR MANAGING WINDOWS APPLICATIONS IN A HETEROGENEOUS SERVER ENVIRONMENT, Ser. No. 09/299,950, filed: Apr. 26, 1999; and, METHOD AND SYSTEM FOR CAPTURING AND STORING SYSTEM CHANGES FOR APPLICATION TO MULTIPLE USERS AND SYSTEMS IN A HETEROGENEOUS SERVER ENVIRONMENT, Ser. No. 09/299,952, filed Apr. 26, 1999; all of which are assigned to the same assignee as the instant application and all of which are incorporated herein by reference.

BACKGROUND OF THE INVENTION

1. Technical Field

The present invention relates generally to an improved distributed data processing system and, in particular, to a method and data processing system for providing administrative management for customizable user environments within a distributed data processing system.

2. Description of Related Art

In distributed data processing systems, the client-server model is a well-known environment. In this model, the user of a computer utilizes a "client" system. The client system runs any of a number of computer operating systems to manage the basic functions that users execute, such as accessing files, executing programs, and system administration, as well as to serve as the base against which programs are written. Well-known client operating systems include Microsoft Windows 3.1, Windows for Workgroups, Windows 95, IBM® OS/2® Warp, Apple Macintosh, DOS, many variations of UNIX, and Microsoft Windows NT. The client system serves as the user's workstation, and it may execute programs as well as store some user data.

The server system can also run any of a number of computer operating systems. Well-known server operating systems include, for example, Novell Netware, IBM OS/2 Warp Server, IBM AS/400®, Microsoft Windows NT, and many variations of OSF UNIX. The server system is accessed by the client system for specific functions. The functions include, but are not limited to, storage and retrieval of data, storage and execution of applications, and storage of and access to user information.

The client-server model continues to evolve to meet the need for distributed resources. As personal computers have gained more functionality and reliability, end-users have improved their productivity through the use of a variety of distributed computing resources. While some enterprise data and legacy applications continue to be placed on reliable mainframe platforms, the need for distributed enterprise access to large numbers of applications and large amounts of data continues to grow.

Operating systems and computing hardware platforms have proliferated, and each combination of computer hardware and software addresses the need for a variety of price, performance, legacy compatibility, and features. Traditional PCs, such as desktop and laptop PCs, are designed to offer highly sophisticated end-user environments. The installation of workgroup computing software and complete application suites requires a computer with significant local storage and local networking capabilities. Network computers (NCs), on the other hand, offer a different type of versatility as they may provide limited access to Java™ and Windows™-based applications. NCs are typically implemented with only a general purpose processor, a system memory, and a communications port. Therefore, NCs typically rely upon network access to provide dynamic, non-volatile data storage capability.

Each of the various implementations of the client-server model has advantages and disadvantages. Networked PCs have the advantage of providing extensive flexibility. In order to accommodate their need for computing resources, users may add peripherals and software applications directly to a PC, while a network administrator may provide other resources on the network for many users in a common fashion. The disadvantages include the immense burden placed on a network or system administrator in ensuring that the various PCs retain some semblance of a standard configuration. Many operating systems provide various levels of system administration capabilities for accomplishing such administrative tasks. However, as users become more technically sophisticated through everyday use of various computing devices, users demand more options in their access to data and to computing resources. For example, people who travel extensively or work at various locations may rely on the ability to have access to a common set of applications wherever they are located. Enormous costs and amounts of time may be spent in accommodating user preferences while pursuing corporate directives for the use of standard configurations.

Industry standards have been developed for both critical and common functions to aid in the implementation of a system containing different types of client systems accessing different types of server systems. The use of these standards on the client and server afford users the opportunity to carry out functions in a consistent manner on a variety of common client and server operating systems, thereby reducing administrative costs. For example, one of the activities that has been standardized is the "authentication" of users. Authentication refers to the process in which a user is validated as being able to complete a logon and/or access a system. Standard protocols have been defined within the X/Open Server Message Block (SMB) specification and the Open Systems Foundation (OSF) Distributed Computing Environment (DCE) specification. While many products and operating systems have been developed that utilize standard protocols, not all products have used the standards. Hence, enterprises confront the difficult challenge of cost-effectively maintaining system administrative knowledge of enterprise-wide computer configurations while allowing some amount of user-specific configuration flexibility within a variety of operating systems that use non-standard protocols and data file formats.

Windows-based applications using the Win32 API's are dominant applications today. These applications are executed on Windows workstations or workstations that support the Win32 APIs in some form, yet many enterprises also use non-Window servers. In today's server-based environments, it is desirable to manage all users, applications, and data from a centralized location. Thus, it would be advantageous to have an improved method and system for managing Windows desktops in a non-Windows-based server environment.

SUMMARY OF THE INVENTION

The present invention provides a method and system for managing Windows desktops in a heterogeneous server environment. A Windows User Profile is generated for a user and associatively stored with desktop information in a datastore on a heterogeneous server. The heterogeneous server may be a non-Windows-based server. The desktop information provides configurability of a desktop of a Windows-based data processing system. The desktop may be a restricted desktop that may be either non-modifiable or only temporarily modifiable by the user for a session on the Windows-based data processing system. The datastore may contain a pair of desktops for a user, in which one of the pair of desktops is a Windows NT desktop and one of the pair of desktops is a Windows 95 desktop or a Windows 98 desktop.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
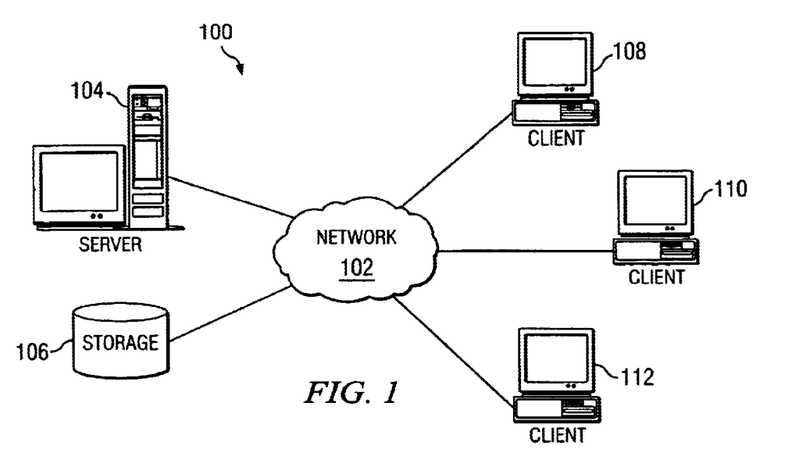
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108-112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

A client running the same operating system as the server is said to be "native," whereas a client running a different operating system from the server is said to be "non-native." Given a Microsoft Windows NT client, examples of non-native servers may include, without limitation, IBM OS/2 Warp Server, IBM LAN Server, other types of Server Message Block (SMB) servers, as well as operating systems that run Open Systems Foundation (OSF) Distributed Computing Environment (DCE) software. An example of the latter is a DCE Cell running Distributed File System (DFS).

The term "homogenous" is commonly used to describe an environment in which the operating system of the client and the operating system of the server that is accessed by the client are the same. The term "heterogeneous" is commonly used to describe an environment in which the client operating system and the server operating system are different.

Figure 2:
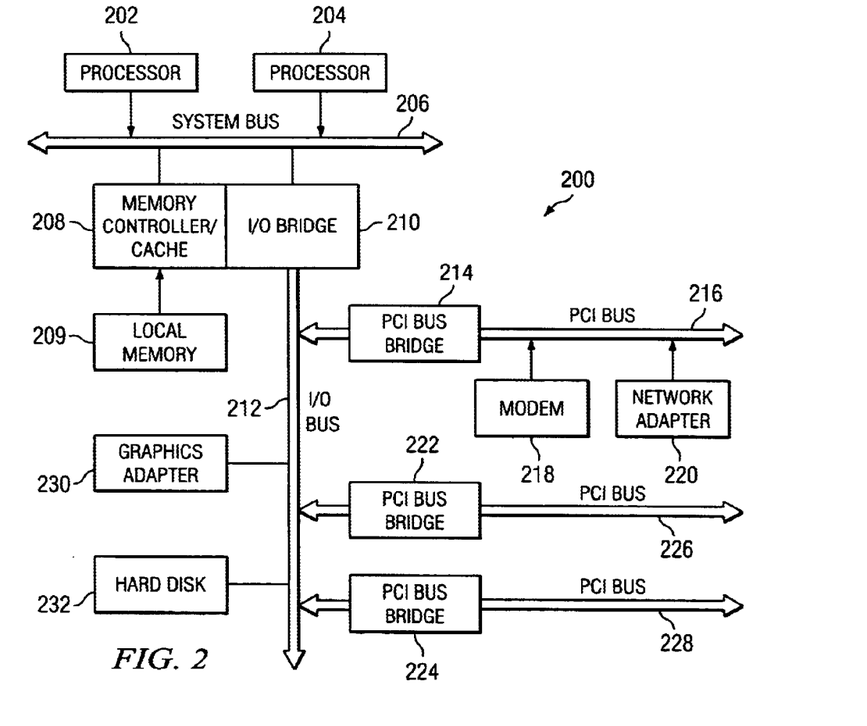
FIG. 2 is a block diagram depicting a data processing system that may be implemented as a server.

Referring to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus

216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted either directly or indirectly.

Those of ordinary skill in the art will appreciate that the hardware depicted in FIG. 2 may vary. For example, other peripheral devices, such as optical disk drives and the like also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
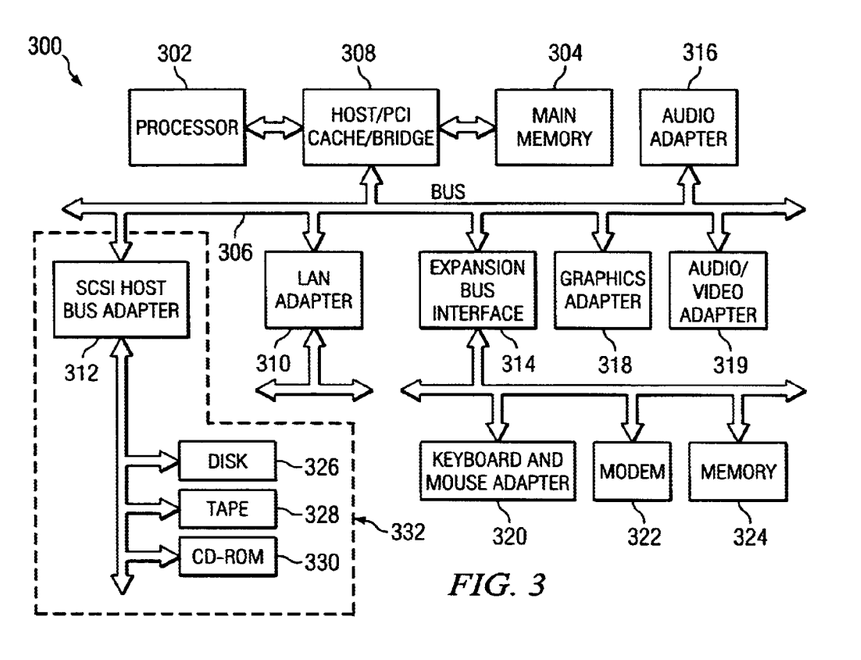
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

Through tailoring by the administrator via standard Windows functionality, a single or series of "default" desktops can be created and stored at a common server location. Through the tailoring, the administrator can create the desired appearance and base functions that they wish to make available to users. When this desktop is created, a series of directories and files are created which together comprise a Windows User Profile.

Figure 10:
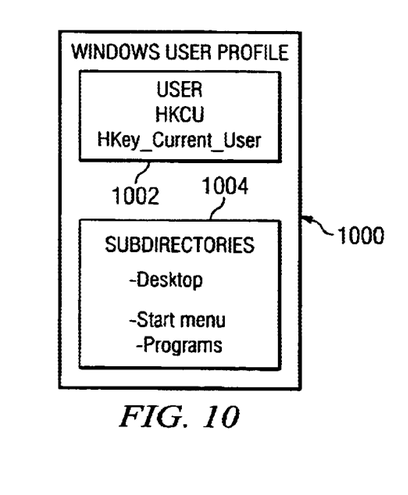
FIG. 10 is a diagram illustrating a Windows user profile depicted in accordance with a preferred embodiment of the present invention.

With reference now to FIG. 10, a diagram illustrating a Windows User Profile is depicted in accordance with a preferred embodiment of the present invention. User profile 1000 includes a user registry file 1002 along with subdirectories 1004. Each user is assigned a user profile, such as user profile 1000. User profile 1000 may be unique for each user or a set of users may be assigned a particular user profile. User registry file 1002 contains the user registry information that is to be sent to a client on which a user logs on. Registry settings include information needed to run the application on the client in a manner set up for a particular user. A registry is a central hierarchical database in Windows 95 and Windows NT used to store information necessary to configure the system for one or more users, applications, and hardware devices. The registry contains information that Windows 95, Windows 98 and Windows NT continually reference during operation, such as profiles for each user, the applications installed on the computer and the types of documents each can create, property sheet settings for folders and application icons, what hardware exists on the system, and which ports are being used. Registry files (.REG) contain information that may be used to update the registry on a client. Initialization files (.INI) contain user preferences and startup information about an application. Information files (.INF) are files containing set-up information for applications and can also be used to initiate registry changes. Subdirectories 1004 contain information, such as the look of the desktop and programs, to be displayed to the user.

The present invention provides a method and system for managing windows desktops in a heterogeneous server environment. The present invention takes affect once this base desktop (Windows User Profile) has been created. A user must have a unique location on the centrally available server to store their desktop that is being managed by the administrator. It is determined if a necessary location exists, and if it does not, one is created. This location can be part of a heterogeneous server. The creation of the location includes the necessary access right changes to protect the user information from others on the system while still enabling the administrator to access and change the desktop information. To support the management of users from the server, the user account on the server is updated to allow the location containing the desktop to be accessed during the authentication process and during the update process.

The assignment of the initial desktop involves copying the directories and files that define the desktop created by the administrator to the user. To enable the user to have multiple type of Windows desktops, such as one for Windows 98 and one for Windows NT, the information can be copied to necessary subdirectories or other structured locations in the user's unique storage area on the server.

To restrict the user from making a permanent change to the desktops, the present invention changes the desktops to mandatory desktops. Through usage of mandatory profiles, changes initiated by the user are never stored at the server and only are in effect during the session in which the user is currently using at the workstation.

During the authentication process, the system ensures the correct location is accessed to retrieve the desktop. By storing and administering the desktops from a server, the user is able to use workstations throughout the network and have the same desktop in all cases.

Within the client-server based system, there is a platform-specific mechanism on the server for defining and recording information on user accounts. A user account may or may not have a predefined home directory location. The server also has defined directory locations where default restricted desktops reside. Each default desktop is unique per operating system type: Windows NT or Windows 9X, where 9X is 95 or 98. The subdirectory for the desktop contains a mandatory user profile, ntuser.man file for Windows NT systems or user.man file for Windows 9X systems, system files and folders (desktop, start menu, programs, etc.), uniquely created on a sandbox system by the system administrator and stored on the server for later retrieval. The administrator can define numerous default desktops to have features specific to each group of users, for example, bank teller, loan officer, etc., each located in a unique directory location. A datastore on the server stores user information defining the desktops and applications per operating system type assigned to each user ID.

Figure 4:
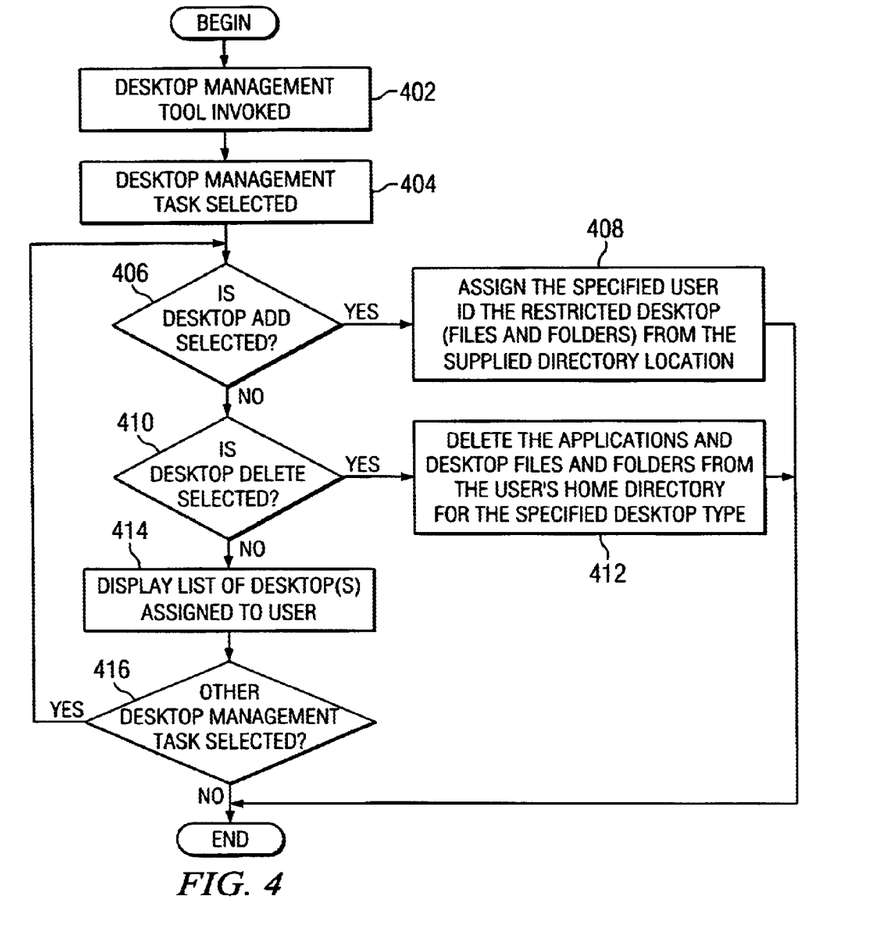
FIG. 4 is a flowchart depicting a process for managing Windows-based desktops for users in a heterogeneous server environment.

With reference now to FIG. 4, a flowchart depicts a process for managing Windows-based desktops for users in a heterogeneous server environment. The process begins by invoking a desktop management tool (step 402). The tool may be implemented such that it ensures that the user of the tool has the proper authority, such as a system administrator level authority. The tool may also ensure that various software services are available on the local machine, etc. A specific desktop management task is selected for a particular user for which a desktop is to be added or deleted (step 404). A determination is then made as to whether a desktop "ADD" has been selected (step 406). If so, then the previously specified user ID is assigned the restricted desktop (files and folders) from the supplied directory location (step 408). The process then branches to continue processing other selections of desktop management tasks.

If the "ADD" task has not been selected, a determination is made as to whether a "DELETE" task has been selected (step 410). If so, then the applications and desktop files and folders are deleted from the user's home directory for the previously specified desktop type (step 412). The process then branches to continue processing other desktop management tasks. If the "DELETE" task has not been selected, then a default action is taken to display a complete list of desktops that are assigned to the user (step 414). A determination is then made as to whether other desktop management tasks have been selected (step 416). If so, then the process branches back to step 406. Otherwise, the desktop management tool completes processing.

Figure 5:
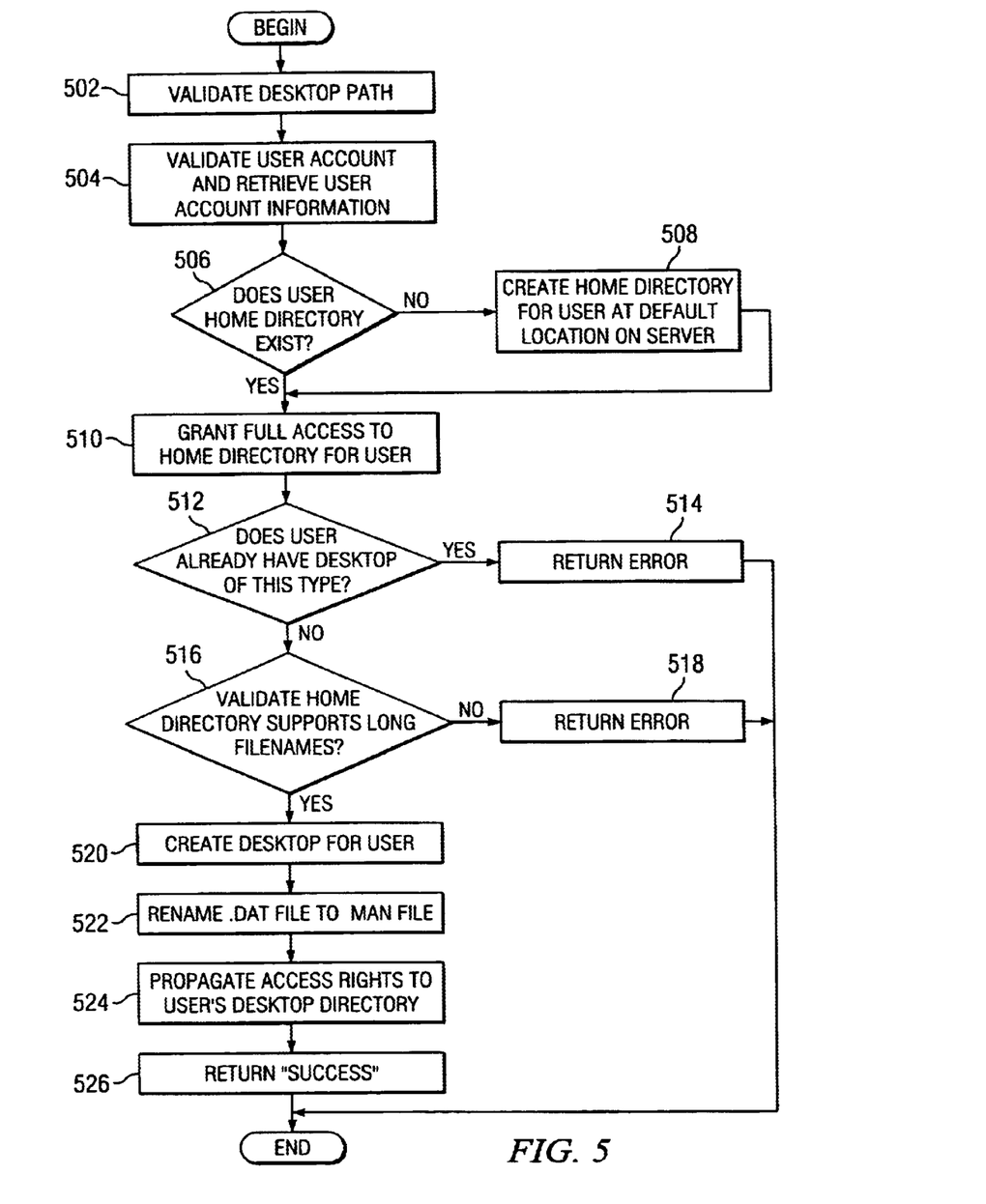
FIG. 5 is a flowchart depicting a process for assigning a desktop of a particular operating system type, Windows NT or Windows 9X, to a user.

With reference now to FIG. 5, a flowchart depicts a process for assigning a desktop of a particular operating system type, Windows NT or Windows 9X, to a user. A user is allowed to have one unique desktop per operating system type, one for Windows NT and one for Windows 9X (either Windows 95 or Windows 98). When a desktop is assigned to a user, the desktop files and folders, including the operating system specific user file ("ntuser.man" file for Windows NT desktops and "user.man" profile for Windows 9X desktops), are copied to the user's home directory in a predefined directory location. For example, Windows NT desktops may be copied to the \PROFILES subdirectory of the user's home directory and Windows 9X desktops are copied to the \PROFILES.W95 subdirectory of the user's home directory. The copy location is referred to as the user's desktop directory. In assigning a desktop to a user, the "user ID", the operating system "type" (Windows NT or Windows 9X), and the desktop path, identifying a directory location on a server to a specific default restricted desktop to be assigned to the user, are passed in as parameters to various application program interfaces (APIs). FIG. 5 is the process within an API for performing the function of assigning a desktop to a user.

The process begins by validating the desktop path passed in as a parameter (step 502). Platform-specific methods are used to determine the existence of the user to whom a desktop is to be assigned (step 504). If the user account exists and is validated, user account information is retrieved. A determination is then made as to whether the user already has a home directory path defined (step 506). If so, then the processing continues without action. If the user home directory does not exist, then a default home directory location on the server is created (step 508).

The process then ensures or grants the user full access capabilities to his home directory, such as read, write, create, execute, and delete privileges (step 510). A determination is then made as to whether the user already has a desktop of this type (step 512). Since a user is only allowed to have one unique desktop per operating system type, the user's home directory is searched for the existence of a user's desktop directory.

A Window's user profile (*.man file) would be located in the user's desktop directory according to the operating system type supplied as a parameter to the API, such as \PROFILES for Windows NT. If the user already has a desktop of this type, then an error is returned and the process completes (step 514). If the user does not already have a desktop of this type, then the process validates that the home directory path on the server supports long file names as may be required by the Windows files stored as part of the Windows desktop (step 516). If not, then an error is returned and the process completes (step 518).

Once the various validation steps have been completed, a desktop is created for the previously specified user (step 520). The process of creating a desktop is described in further detail below. The process then determines if the user profile of the desktop, which has been created and copied into the user's desktop directory, ends with the .DAT, and if so, the file is renamed with a MAN suffix (step 522). This step of renaming the suffix of the file is necessary to restrict the user from being able to update the desktop features defined by the system administrator after the user has logged onto the client.

During a user logoff, the Windows operating systems must decide whether to save any desktop changes made by the user. If the file type ends with .DAT, the changes are saved. If the file type ends with MAN, a Windows operating system determines that changes are not to be saved, and they are discarded.

The process then ensures that the user's full access permissions are propagated to the user's desktop directory and subdirectories so that the desktop displayed for the user on the client is accurate (step 524). The process then returns a successful completion code and completes processing (step 526).

Figures 6, 7:
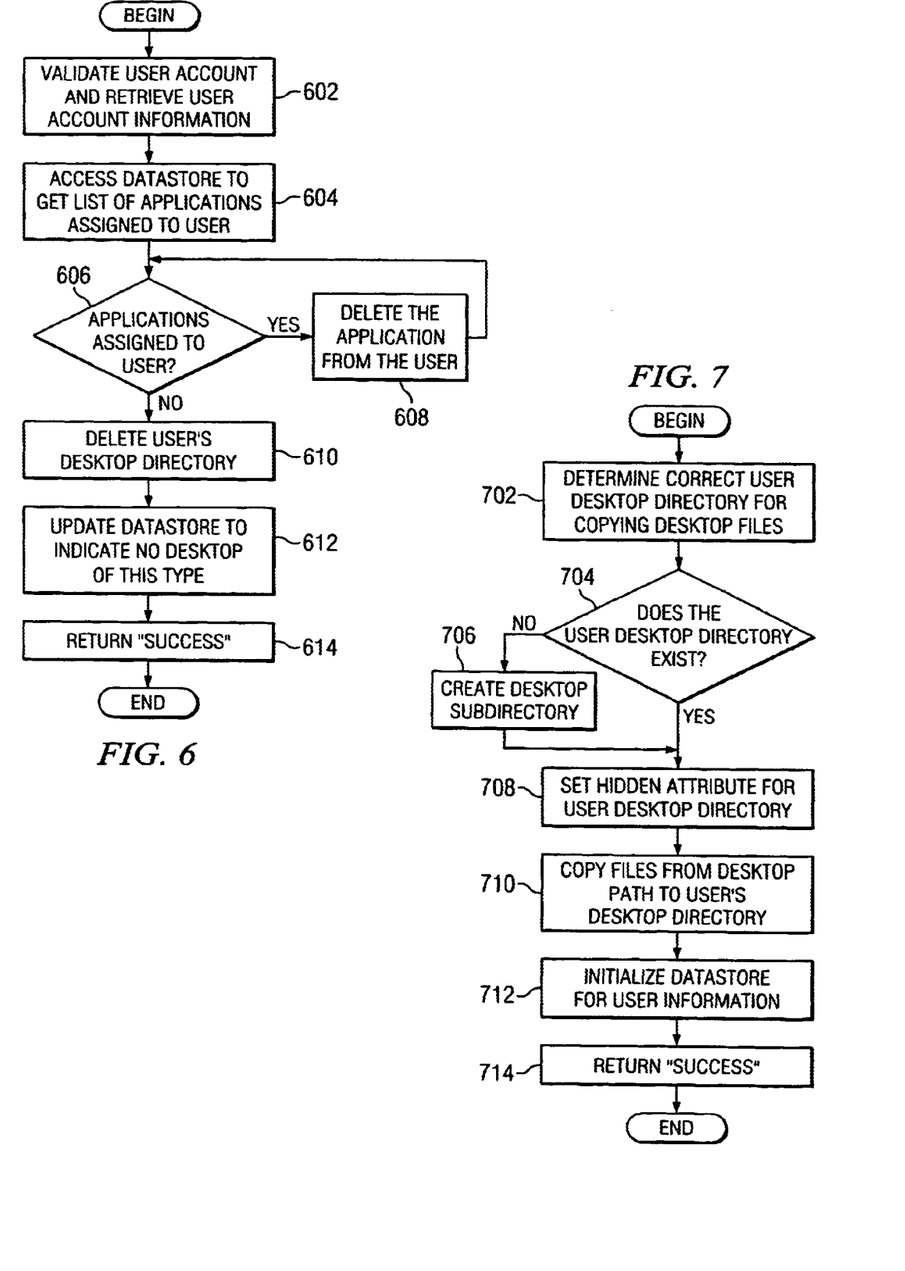
FIG. 6 is a flow chart depicting a process used to delete a desktop of a particular operating system type from a user.
FIG. 7 is a flowchart depicting a process for creating a desktop for a user.

With reference now to FIG. 6, a flow chart depicts a process used to delete a desktop of a particular operating system type from a user. FIG. 3 is an implementation of an API that may be invoked by a desktop management tool. The "user ID" and the operating system "type" (Windows NT or Windows 9X) are passed as parameters to the API. The process begins by using platform-specific methods to determine the existence of the user for whom a desktop is to be deleted (step 602). If the user account is validated, user account information is retrieved, such as the user's home directory location. The datastore is then accessed to get a list of applications assigned to the specified user for the operating system type that has been passed in as a parameter to the API (step 604). A determination is then made as to whether applications of this type have been assigned to this user (step 606). If so, then the application is deleted from the user (step 608). The process continues to loop to delete the applications of this type from the user. When the applications have been deleted from the user, the user's desktop directory is deleted (step 610). The user's desktop directory is the known location in the user's home directory where the desktop files reside. For example, this may be a \PROFILES.W95 directory or subdirectory for Windows 9X desktops. The process then updates the entry for this user in the datastore on the server to indicate the removal of the desktop path stored for the desktop of this operating system type (step 612). The process then returns a successful return code and completes processing (step 614).

With reference now to FIG. 7, a flowchart depicts a process for creating a desktop for a user. This process may be incorporated into the process for assigning a desktop to the user, such as the process described above with respect to FIG. 5. The process begins by determining the correct user desktop directory into which the desktop files are to be copied (step 702). For example, the desktop directory may be specified within a \PROFILES subdirectory for Windows NT desktops within the user's home directory. The user's desktop directory may be used as the target subdirectory for the desktop files and folders. A determination is then made as to whether the user desktop directory exists (step 704). If not, then the desktop subdirectory is created (step 706). Once the desktop directory is created, or if the desktop directory already exists, then the Hidden attribute for the user desktop directory is set to limit the user's viewing access of the directory (step 708). The process then copies the desktop files and folders from the desktop path supplied to the user's desktop directory (step 710). The datastore for the specified user is initialized with the appropriate user information (step 712). The entry for the user should contain the desktop path from which the desktop for the user was copied and should indicate that no applications of this operating system type are currently assigned to the user. A successful return code is then returned to indicate successful completion of the API (step 714).

Figure 8:
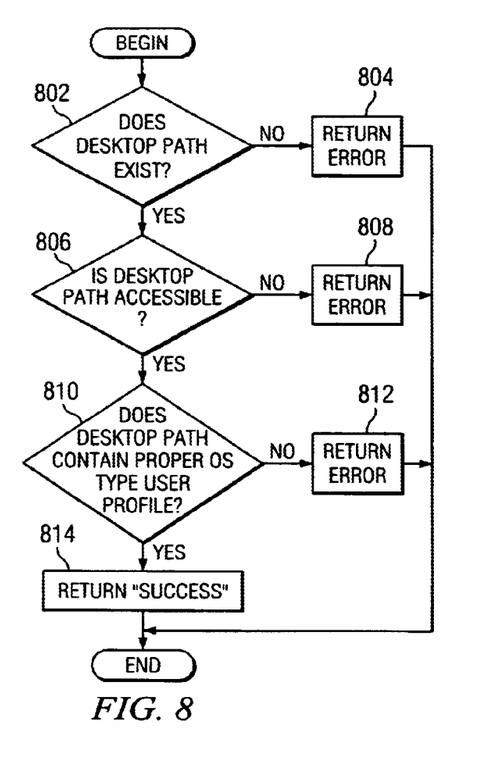
FIG. 8 is a flowchart depicting a process for validating a desktop path.

With reference now to FIG. 8, a flowchart depicts a process for validating a desktop path. This process may be used as an API within other APIs invoked by a desktop management tool. The process begins by determining whether a desktop path exists (step 802). If not, an error is returned and the process completes (step 804). If the desktop path does exist, then a determination is made as to whether the desktop path is accessible (step 806). If not, an error is returned and the process completes (step 808). A determination is then made as to whether the desktop path contains a proper operating system type user profile (step 810). If not, an error is returned and the process completes (step 812). For Windows NT systems, the user profile is ntuser.dat or ntuser.man. For Windows 9X systems, the user profile is user.dat or user.man. A successful return code is then returned to indicate successful completion of the API (step 814).

Figure 9:
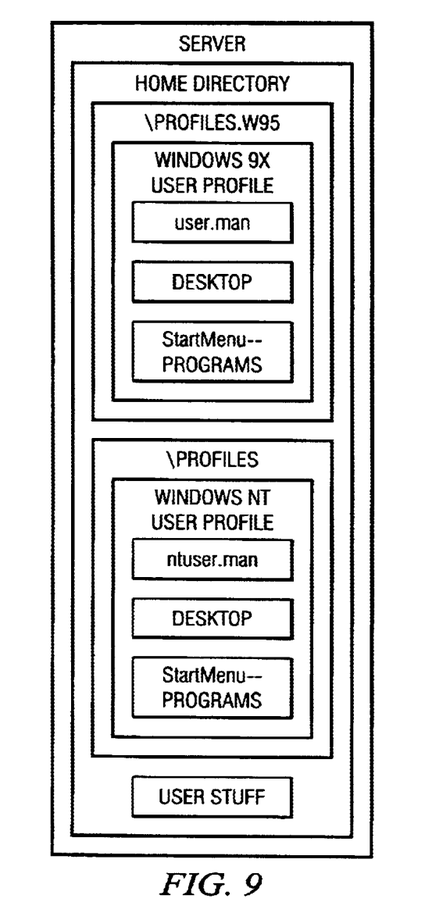
FIG. 9 is a block diagram depicting the directory structure for storing the user profiles and desktops.

With reference now to FIG. 9, a block diagram depicts the directory structure for storing the user profiles and desktops. Usage of a home directory stored at a server enables a user to roam throughout a network yet always have access to the user's data. By using this location for the user's desktops, the system allows a user to always have the same look-and-feel along with access to a common set of applications. The Windows User Profiles are standard for Windows operating systems. By having unique locations, a system may store multiple desktops for a user.

The advantages of the present invention should be apparent in light of the detailed description of the invention provided above. An advantage is achieved in the manner in which an administrator at a server can define and designate the desktop to be assigned to a specific user. Through mechanisms used by the present invention, the desktop is defined in a manner in which updates initiated by the user are prevented, which allows the administrator to control all updates to a users desktop. This is all done in a heterogeneous server environment which enables an administrator to totally control the Windows-based applications available to end users of the server.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of administering a Windows desktop from a non-Windows-based server, the method comprising the computer-implemented steps of:

generating a Windows User Profile for a user; and associatively storing the Windows User Profile with desktop information in a datastore on said non-Windows-based server;

wherein an administrator can control said desktop information through said non-Windows-based server.

2. The method of claim 1, wherein said non-Windows-based server is part of a distributed data processing system.

3. The method of claim 1, wherein the desktop information provides configurability of a desktop of a Windows-based data processing system.

4. The method of claim 3, wherein the configurability is on a per-user basis.

5. The method of claim 1, wherein the said desktop information includes user-specific files.

6. The method of claim 1, wherein the desktop comprises a Windows 95 desktop, a Windows 98 desktop, or a Windows NT desktop.

7. The method of claim 1, wherein the datastore comprises a pair of desktops for a user, wherein one of the pair of desktops is a Windows NT desktop and one of the pair of desktops is a Windows 95 desktop or a Windows 98 desktop.

8. The method of claim 1, wherein said Windows User Profile provides a mandatory desktop for the user.

9. The method of claim 1, wherein each user has a unique location in said server for storage of a respective Windows User Profile.

10. The method of claim 1, wherein the user can access a respective desktop from a plurality of workstations in the data processing system.

11. The method of claim 1, further comprising the step of ensuring that a person performing said storing step has the authority to do so.

12. An apparatus of administering a Windows desktop from a non-Windows-based server, the apparatus comprising:

generating means for generating a Windows User Profile for a user; and storing means for associatively storing the Windows User Profile with desktop information in a datastore on said non-Windows-based server.

13. The apparatus of claim 12 further comprising:

managing means for managing a desktop of a client from said non-Windows-based server in a distributed data processing system.

14. The apparatus of claim 12, wherein the desktop information provides configurability of a desktop of a Windows-based data processing system.

15. The apparatus of claim 14, wherein the configurability is on a per-user basis.

16. The apparatus of claim 14, wherein the desktop information includes user-specific files.

17. The apparatus of claim 14, wherein the desktop comprises a Windows 95 desktop, a Windows 98 desktop, or a Windows NT desktop.

18. The apparatus of claim 14, wherein the datastore may comprise a pair of desktops for a the user, wherein one of the pair of desktops is a Windows NT desktop and one of the pair of desktops is a Windows 95 desktop or a Windows 98 desktop.

19. The apparatus of claim 12, wherein said Windows User Profile provides a mandatory desktop for the user.

20. The apparatus of claim 12, wherein said storing means stores said Windows User Profile in a unique location for each respective user.

21. The apparatus of claim 12, wherein each respective desktop can be accessed from a plurality of workstations in the data processing system.

22. The apparatus of claim 12, wherein said storing means ensures that a person storing said Windows User Profile has the authority to do so.

23. A method of administering a Windows desktop from a non-Windows-based server in a data processing system, the method comprising the computer-implemented steps of:

generating a Windows User Profile for a user; and associatively storing said Windows User Profile with desktop information in a datastore on a non-Windows-based server, wherein the desktop information provides configurability of a desktop of a Windows-based data processing system.

24. The method of claim 23, wherein said Windows User Profile provides a mandatory desktop for the user.

25. The method of claim 23, wherein each user has a unique location in said server for storage of a respective Windows User Profile.

26. The method of claim 23, wherein the user can access a respective desktop from a plurality of workstations in the data processing system.

27. The method of claim 23, further comprising the step of ensuring that a person performing said storing step has the authority to do so.

28. A method of administering a Windows desktop from a non-Windows-based server, the method comprising the computer-implemented steps of:

generating a Windows User Profile for a user; and associatively storing the Windows User Profile with desktop information in a datastore on said non-Windows-based server;

wherein the desktop information provides configurability of a desktop of a Windows-based data processing system;

wherein the desktop is a restricted desktop that may not be modified by the user of said Windows-based data processing system.

29. A method of administering a Windows desktop form a non-Windows-based server, the method comprising the computer-implemented steps of:

generating a Windows User Profile for a user; and associatively storing the Windows User Profile with desktop information in a datastore on said non-Windows-based server;

wherein the desktop information provides configurability of a desktop of a Windows-based data processing system;

wherein the desktop is a restricted desktop that may be temporarily modified by the user for a session on said Windows-based data processing system.

30. An apparatus for administering a Windows desktop from a non-Windows-based server, the apparatus comprising:

generating means for generating a Windows User Profile for a user; and storing means for associatively storing the Windows User Profile with desktop information in a datastore on said non-Windows-based server;

wherein the desktop information provides configurability of a desktop of a Windows-based data processing system;

wherein the desktop is a restricted desktop that may not be modified by the user of the Windows-based data processing system.

31. An apparatus for administering a Windows desktop from a non-Windows-based server, the apparatus comprising:

generating means for generating a Windows User Profile for a user; and storing means for associatively storing the Windows User Profile with desktop information in a datastore on said non-Windows-based server;

wherein the desktop information provides configurability of a desktop of a Windows-based data processing system;

wherein the desktop is a restricted desktop that may be temporarily modified by the user for a session on the Windows-based data processing system.

32. A computer program product on a computer-readable medium for administering a Windows desktop from a non-Windows-based server, the computer program product comprising:

first instructions for generating a Windows User Profile for a user; and second instructions for associatively storing the Windows User Profile with desktop information in a datastore on a non-Windows-based server, wherein the desktop information provides configurability of a desktop of a Windows-based data processing system.

33. The computer program product of claim 32, wherein said Windows User Profile provides a mandatory desktop for the user.

34. The computer program product of claim 32, wherein said second instructions stores a respective Windows User Profile in a unique location for each respective user.

35. The computer program product of claim 32, wherein stored desktop information can be accessed from a plurality of workstations in the data processing system.

36. The computer program product of claim 32, wherein said second instructions ensure that a person requesting said storing step has the authority to do so.

37. A computer program product on a computer-readable medium for administering a Windows desktop from a non-Windows-based server, the computer program product comprising:

first instructions for generating a Windows User Profile for a user; and second instructions for associatively storing the Windows User Profile with desktop information in a datastore on a said non-Windows-based server.

38. The computer program product of claim 37, wherein said Windows User Profile provides a mandatory desktop for the user.

39. The computer program product of claim 37, wherein said second instructions stores a respective Windows User Profile in a unique location for each respective user.

40. The computer program product of claim 37, wherein stored desktop information can be accessed from a plurality of workstations in the data processing system.

41. The computer program product of claim 37, wherein said second instructions ensure that a person requesting said storing step has the authority to do so.

* * * * *